United States Patent
Goldfine et al.

(10) Patent No.: US 7,533,575 B2
(45) Date of Patent: May 19, 2009

(54) QUASISTATIC MAGNETIC AND ELECTRIC FIELD STRESS/STRAIN GAGES (75) Inventors: Neil J. Goldfine, Newton, MA (US); Darrell E. Schlicker, Watertown, MA (US); David C. Grundy, Reading, MA (US); Yanko K. Sheiretov, Waltham, MA (US); Leandro M. Lorilla, Cambridge, MA (US); Vladimir A. Zilberstein, Chestnut Hill, MA (US); Volker Weiss, Syracuse, NY (US); J. Timothy Lovett, Fayetteville, AR (US); Andrew P. Washabaugh, Chula Vista, CA (US)

(73) Assignee: JENTEK Sensors, Inc., Waltham, MA (US)

( * ) Notice: Subject to any disclaimer, the term of this patent is extended or adjusted under 35 U.S.C. 154(b) by 63 days.

(21) Appl. No.: 11/702,422

(22) Filed: Feb. 5, 2007

(65) Prior Publication Data

US 2007/0245834 A1 Oct. 25, 2007

Related U.S. Application Data (60) Provisional application No. 60/765,352, filed on Feb. 3, 2006.

(51) Int. Cl.
*G01L 1/00* (2006.01)
*G01L 1/12* (2006.01)
*G01B 7/24* (2006.01)
*G01N 27/82* (2006.01)

(52) U.S. Cl. .................. 73/779; 73/862.68; 73/862.69; 324/209; 324/240; 324/242

(58) Field of Classification Search ............ 73/862.191, 73/862.331, 593; 324/240
See application file for complete search history.

(56) References Cited

U.S. PATENT DOCUMENTS 4,814,690 A 3/1989 Melcher et al.

(Continued)

OTHER PUBLICATIONS

Sparis et al. "A Helicopter Planetary Gear Carrier Plate Crack Analysis and Feature Extraction based on Ground and Aircraft Tests" Proceedings of the 2005 IEEE International Symposium on Intelligent Control. Jun. 27-29, 2005. pp. 646-651.*

(Continued)

*Primary Examiner*—Lisa M Caputo
*Assistant Examiner*—Jonathan Dunlap
(74) *Attorney, Agent, or Firm*—Hamilton, Brook, Smith & Reynolds, P.C.

(57) ABSTRACT

Magnetic or electric field sensors are mounted against a material surface and used for stress, strain, and load monitoring of rotating components such as vehicle drive trains. The stationary sensors are mounted at multiple locations around the component and used assess the stress on the component at multiple rotational positions. The sensor response is typically converted into a material property, such as magnetic permeability or electrical conductivity, which accounts for any coating thickness that may be present between the sensor and mounting surface. The sensors are not in direct contact with the rotating component and are typically mounted on an annular material or ring that encircles the rotating component. Measurements of the annular material properties, such as the stress, are related to the stress on the rotating component and discrete features on the component. As a particular example, the rotating component is a planetary gear system, with sensors mounted on the ring gear and the discrete features are carrier plate posts. The sensors are preferably mounted at equal distances around the circumference of the component. The sensors and instrumentation may be removable and reusable for monitoring of additional components.

20 Claims, 9 Drawing Sheets

U.S. PATENT DOCUMENTS

| | | |
|---|---|---|
| 5,015,951 A | 5/1991 | Melcher |
| 5,453,689 A | 9/1995 | Goldfine et al. |
| 5,793,206 A | 8/1998 | Goldfine et al. |
| RE36,986 E | 12/2000 | Melcher |
| 6,188,218 B1 | 2/2001 | Goldfine et al. |
| 6,252,398 B1 | 6/2001 | Goldfine et al. |
| 6,298,725 B1 * | 10/2001 | Forrester .................... 73/593 |
| 6,377,039 B1 | 4/2002 | Goldfine et al. |
| 6,380,747 B1 | 4/2002 | Goldfine et al. |
| 6,486,673 B1 | 11/2002 | Goldfine et al. |
| 6,657,429 B1 | 12/2003 | Goldfine et al. |
| 6,781,387 B2 | 8/2004 | Goldfine et al. |
| 6,785,635 B2 * | 8/2004 | von Flotow ................. 702/33 |
| 6,898,975 B2 * | 5/2005 | Blunt ......................... 73/593 |
| 7,373,823 B2 * | 5/2008 | Bosselmann et al. ......... 73/620 |
| 2003/0173958 A1 | 9/2003 | Goldfine et al. |
| 2005/0171703 A1 * | 8/2005 | Goldfine et al. ............... 702/30 |
| 2007/0114993 A1 | 5/2007 | Goldfine et al. |

OTHER PUBLICATIONS

Krantz, Timothy L. "Gear Tooth Stress Measurements of Two Helicopter Planetary Stage" Sixth International Power Transmission and Gearing Conference, Phoeniz, AZ, Sep. 13-16, 1992. Accessed online Aug. 11, 2008. <http://stinet.dtic.mil/cgi-bin/GetTRDoc?AD=ADA252378&Location=U2&doc=GetTRDoc.pdf>.*

* cited by examiner

QUASISTATIC MAGNETIC AND ELECTRIC FIELD STRESS/STRAIN GAGES

RELATED APPLICATION

This application claims the benefit of U.S. Provisional Application Nos. 60/765,352 filed Feb. 3, 2006, the entire teachings of which are incorporated herein by reference.

BACKGROUND OF THE INVENTION

The technical field of this invention is that of stress, strain and load monitoring and sensing. The fields of strain sensing using strain gages and load monitoring are relatively mature with numerous approaches that enable monitoring of stresses, strains and loads. These include conventional strain gages, optical fiber strain gages, and ultrasonic methods.

These types of stress and strain monitoring are important for developing health usage and monitoring systems for vehicles such as rotorcraft. These systems require technologies such as direct load monitoring, on-board damage monitoring and advanced diagnostics for early fault detection to meet the demand for increased safety and reduced operational cost. For example, early detection of damage and cracks in air vehicle structures supports a more effective damage tolerance approach and supplements mechanical diagnostics and usage monitoring. In particular, on-board damage monitoring can provide timely detection of mechanical damages that remain undetectable by conventional methods until the next scheduled inspection, which can enhance safety, improve readiness and mission performance, and reduce maintenance costs.

Magnetic field or eddy current sensors have also been used to assess the stress on a material. Conventional eddy-current sensing involves the excitation of a conducting winding, the primary, with an electric current source of prescribed frequency. This produces a time-varying magnetic field, which in turn is detected with a sensing winding, the secondary. The spatial distribution of the magnetic field and the field measured by the secondary is influenced by the proximity and physical properties (electrical conductivity and magnetic permeability) of nearby materials. When the sensor is intentionally placed in close proximity to a test material, the physical properties of the material can be deduced from measurements of the impedance between the primary and secondary windings. As examples, Goldfine et. al. have disclosed methods under U.S. Pat. Nos. 5,015,951, RE36,986, 5,453,689, 5,793,206, 6,188,218, 6,252,398, 6,377,039, and 6,657,429 that describe magnetic field sensors that operate in the magneto-quasistatic regime (in other words, the wavelength of traveling waves is long compared to the sensor dimensions). These sensors use precomputed databases of sensor response to estimate the lift-off (sensor proximity) and directional magnetic permeability, directional electrical conductivity, and layer thicknesses for uniform, layered and modified-surface materials.

SUMMARY OF THE INVENTION

Aspects of the methods described herein involve nondestructive evaluation of stress and material condition in vehicular drive trains and similar mechanisms such as those used in rotorcraft.

In one embodiment, the stress on a rotating component is assessed by mounting at least two sensors at different locations around the component. The sensors are mounted so that they are not in direct contact with the rotating component and the sensors remain in a stationary position even as the component rotates. A response is then measured with each sensor as the component rotates. The data acquisition rate or sampling rate for the measurements is sufficiently large to provide information about the stress variation with rotational position so that peak stress or load on the component can be assessed. The sensor response is then used to measure a material property of the rotating component, such as a magnetic permeability or electrical conductivity, for multiple rotational positions. This material property is then related to the stress on the component itself. In an embodiment, the sensors used for this monitoring are strain gages. In particular embodiments, the strain gages use a magnetic field or an electric field for interrogating the material under examination. In an embodiment, four sensors are mounted around the circumference of the component. In another embodiment, the sampling rate is intentionally not synchronized with the rotation speed so that the circumferential sampling density increases with additional rotation or turn of the component.

In an embodiment, the sensors are mounted onto the surface of an annular material that encircles the rotating component. In this case, the sensors are used to monitor the condition of the annular material, which in-turn is related to the stress of the rotating component and provides operational information about the rotating component, such as the presence of a geometric misalignment. In some cases, it is desirable to mount the sensors with minimal, if any, modifications to the surface, such as removal of paint or other protective coatings. In these cases, a coating may be present between the annular material and the sensor. In an embodiment, the conversion to the material property corrects for this coating thickness.

In another embodiment, the goal is to assess the stress on individual discrete features on a rotating component. In particular, the system being monitored is a drive train and the rotating component is a planetary gear carrier plate. In this embodiment, the discrete feature is a planet post or carrier plate post on the planetary gear carrier plate. In an embodiment, the sensors are mounted on the outer surface of the ring gear which encircles the planetary gear carrier plate. Preferably, the number of sensors equals the number of discrete features in order to obtain an optimal monitoring response performance with the fewest number of sensors. In another embodiment, a parameterized function is used to represent the load variation with position for each feature and two parameters, such as the mean and peak loads, are estimated for each feature.

In yet another embodiment, a magnetic stress gage sensor is mounted onto a component of a vehicle and used to assess a material condition of the vehicle. Instrumentation is placed onto or on-board the vehicle so that the sensor response is monitored while the vehicle is being operated. The sensor response is then used to assess the condition of interest for the vehicle, such as a geometric misalignment of the component or the stress on the component. After the diagnosis is performed to assess this condition, the instrumentation is removed from the vehicle. In an embodiment, the sensor is permanently mounted or bonded to a component surface. Typically this is in a difficult-to-access location and facilitates future diagnostic measurements since portable instrumentation may be brought onto the vehicle for occasional diagnostic assessments. In another embodiment, the sensors and instrumentation are both removable and reusable. This can provide significant cost savings when the condition of numerous vehicles needs to be assessed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

The teachings of all patents, published applications and references cited herein are incorporated by reference in their entirety.

A description of preferred embodiments of the invention follows.

This invention addresses the need for improved system identification for design, manufacturing qualification, control and life management of drive train and similar mechanisms such as those used in rotorcraft. This is accomplished using sensor constructs mounted near the component material of interest and that use magnetic fields or electric fields to interrogate the test material. These sensors are operated in the quasistatic frequency regime and the material properties being monitored reflect the strain, stress or load on the component. This direct sensing of loads, temperatures, and geometric and kinematic states provides enhanced system and subsystem identification.

Figure 1:
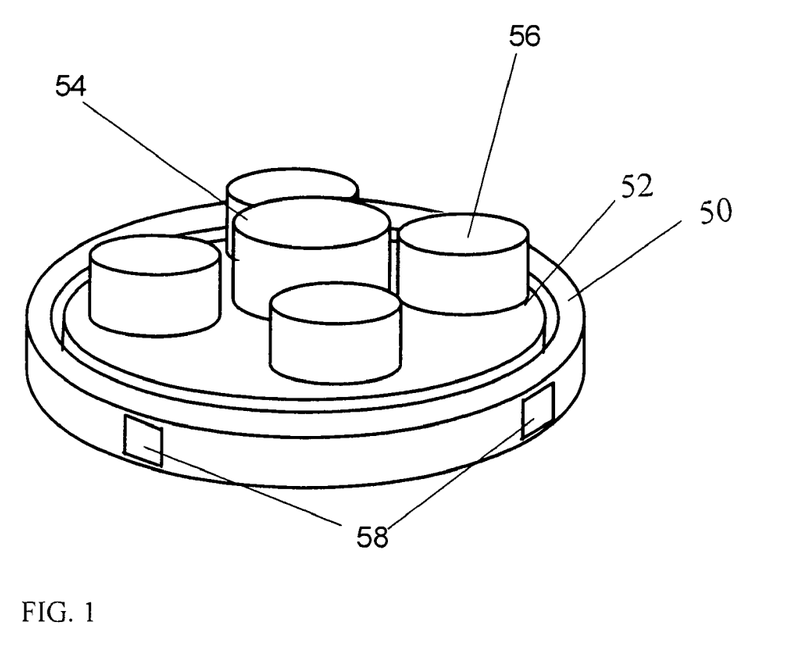
FIG. 1 shows a drawing of a ring gear and planetary gear subsystem.

FIG. 1 shows an example configuration where several sensors are mounted around a rotating component. In this case, an annular ring gear 50 encircles a carrier plate and planetary gear subsystem 52 as part of the transmission for a rotorcraft. The carrier plate 52 has a central post 54 as well as several carrier posts or planet posts 56. When connected to other components in the vehicle, the rotation of the carrier plates causes periodic loading and unloading on the central post and planets. These loading cycles and the stress associated with these loading cycles can cause fatigue damage to the planet posts that can compromise the safe operation of the rotorcraft. Sensors 58 placed at multiple locations around the outer surface of the ring gear circumference provide a direct measurement of the stresses on the ring gear. Measurements of these dynamic stresses, in turn, can be related to the stresses on individual planet posts if the sampling rate is large enough compared to the rotation rate of the gear, and the sensor signal relative to the noise and the number of sensors are sufficient.

Figure 2:
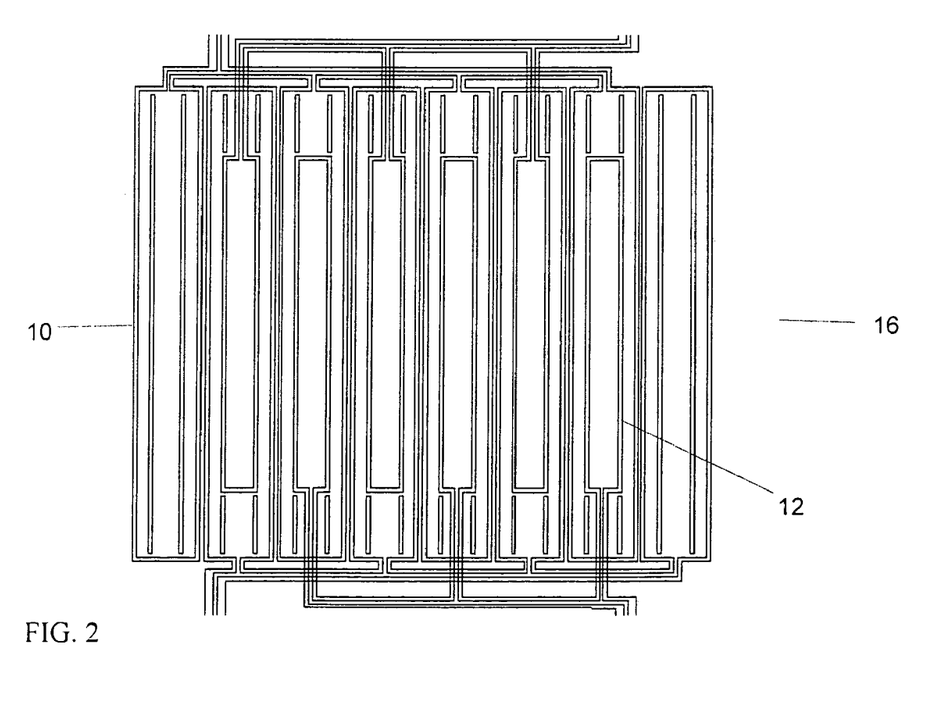
FIG. 2 shows a drawing of a spatially periodic field eddy-current sensor.

An example magnetic field based sensor that operates in the magnetoquasistatic regime and is well-suited to this approach is shown in FIG. 2. This meandering winding magnetometer (MWM®) is a "planar," conformable eddy-current sensor that was designed to support quantitative and autonomous data interpretation methods. The sensor 16 is described in U.S. Pat. Nos. 5,453,689, 5,793,206, 6,188,218, and 6,657,429. The sensor includes a primary winding 10 having extended portions for creating the magnetic field and secondary windings 12 within the primary winding for sensing the response. The primary winding is fabricated in a spatially periodic pattern with the dimension of the spatial periodicity termed the spatial wavelength $\lambda$. A current is applied to the primary winding to create a magnetic field and the response of the test material to the magnetic field is determined through the voltage measured at the terminals of the secondary windings. This geometry creates a magnetic field distribution similar to that of a single meandering primary winding. A single element sensor has all of the sensing elements connected together. The net magnetic vector potential produced by the current in the primary can be accurately modeled as a Fourier series summation of spatial sinusoids, with the dominant mode having the spatial wavelength $\lambda$. For an MWM-Array, the responses from individual or combinations of the secondary windings can be used to provide a plurality of sense signals for a single primary winding construct as described in U.S. Pat. No. 5,793,206 and Re. 36,986.

Typically it is beneficial to convert the sense element response into more meaningful physical parameters associated with the test material, such as an electrical conductivity or magnetic permeability. In addition, if the sensor lift-off or proximity to the test material is determined, this provides self-diagnostic information about the state of the sensor, which is particularly useful for surface mounted sensor arrays where access to the sensor array may be limited. An efficient method for converting the sensor response into material or geometric properties is to use grid measurement methods. These methods map two known values, such as the magnitude and phase or real and imaginary parts of the sensor impedance, into the properties to be determined. The measurement grids are two-dimensional databases that can be visualized as "grids" that relate two measured parameters to two unknowns, such as the magnetic permeability (or electrical conductivity) and lift-off (where lift-off is defined as the proximity of the test material to the plane of the MWM windings). For the characterization of coatings or surface layer properties, three- (or more)-dimensional versions of the measurement grids called lattices and hypercubes, respectively, can be used. Alternatively, the surface layer parameters can be determined from numerical algorithms that minimize the least-squares error between the measurements and the predicted responses from the sensor, or by intelligent interpolation search methods within the grids, lattices or hypercubes.

Figure 3:
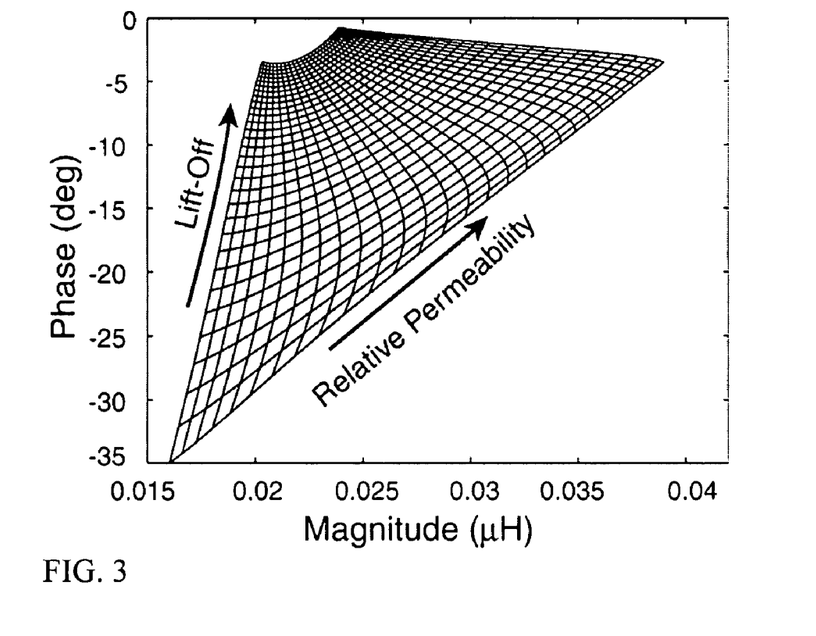
FIG. 3 shows a representative measurement grid relating the magnitude and phase of the sensor terminal impedance to the lift-off and magnetic permeability.
Figure 4:
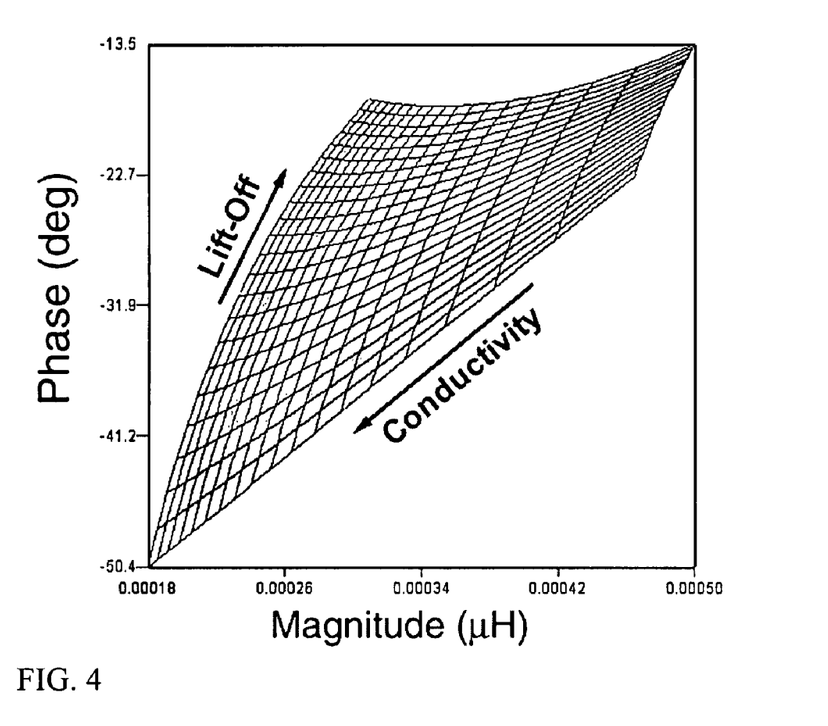
FIG. 4 shows a representative measurement grid relating the magnitude and phase of the sensor terminal impedance to the lift-off and electrical conductivity.

For ferromagnetic materials, such as most steels, a measurement grid can provide a conversion of raw data to magnetic permeability and lift-off. A representative measurement grid for ferromagnetic materials is illustrated in FIG. 3. A representative measurement grid for a low-conductivity non-magnetic alloy (e.g., titanium alloys, some superalloys, and austenitic stainless steels) is illustrated in FIG. 4. For coated materials, such as cadmium and cadmium alloys on steels, the properties of the coatings can be incorporated into the model response for the sensor so that the measurement grid accurately reflects, for example, the permeability variations of substrate material with stress and the lift-off. Lattices and hypercubes can be used to include variations in coating properties (thickness, conductivity, permeability), over the imaging region of interest. The variation in the coating can be corrected for each sensor or sense element individually to improve the measurement of permeability in the substrate for the purpose of assessing stresses. The effective property can also be a layer thickness, which is particularly suitable for coated systems. For example, the thickness of paint between the sensor and the surface of the material under examination, such as a steel ring gear can be allowed to vary. Since the sensor independently measures the magnetic permeability and lift-off, the measured permeability effectively compensates for the paint thickness variations.

Figure 5:
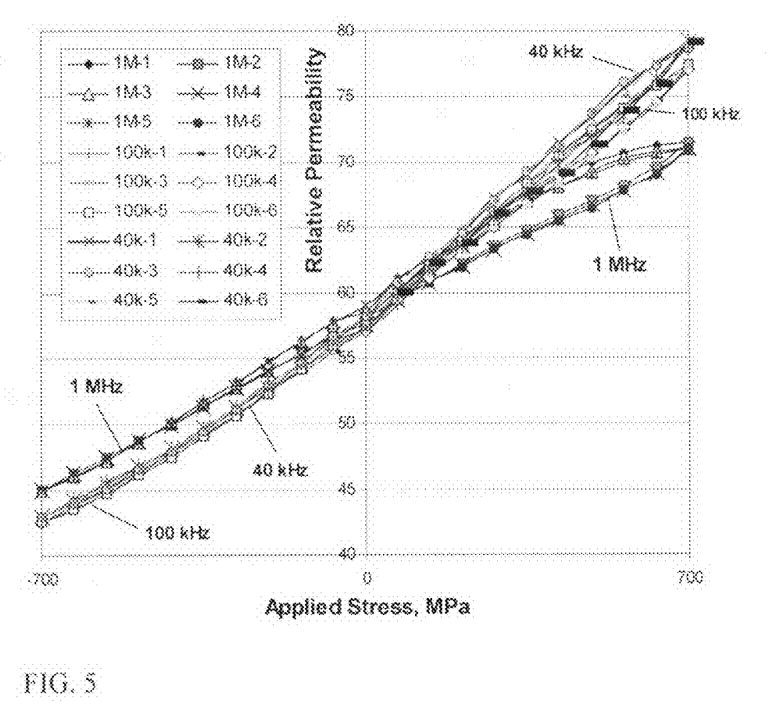
FIG. 5 shows the magnetic permeability variation with bending stress in a shot-peened high-strength steel specimen.

For monitoring the stress on a material, such as discrete features or planetary gear posts of a planetary gear system, the effective property being measured by the sensor needs to be stress (or strain) dependent. For magnetic materials, such as steels, this effective property is typically the magnetic permeability. FIG. 5 shows an example magnetic permeability variation with applied stress for a shot-peened ferromagnetic steel at several excitation frequencies. Also, for sensors such as that shown in FIG. 2 which have the capability to perform directional permeability measurements, as described for example in U.S. patent application Ser. No. 10/351,978, filed Jan. 24, 2003, the entire teachings of which are incorporated herein by reference, the directions of the principal stresses can be determined. This orientation dependence can also affect the sensitivity of the sensor to the dynamic stresses from the rotating component. For non-magnetic materials, the effective property is typically the electrical conductivity. As described for example in U.S. patent application Ser. No. 11/292,146, filed Nov. 30, 2005, the entire teachings of which are incorporated herein by reference, the electrical conductivity of numerous metals varies with the applied stress. Both of the above references also describe performing dynamic stress measurements as a material is being mechanically loaded. Another option for the monitoring of non-magnetic materials is to add a ferromagnetic coating, such as a cobalt or nickel based alloy, as a diagnostic layer that can enhance the observability of the state of the material of interest. For composites or otherwise heterogeneous materials, the effective conductivity or effective complex permeability can be used to measure the stress.

For insulating, semi-insulating, or semiconducting materials, dielectric sensors which use an interrogating electric field are more suitable than inductive or magnetic field sensors. For these capacitive sensors, the dielectric properties of a material can often be described by two parameters, the permittivity and conductivity. The permittivity is a constitutive parameter that relates the displacement current density in the material to the applied electric field, whereas the conductivity applies to the conduction current density. The dielectric properties of materials vary significantly and can provide a means for characterizing materials and assessing geometric properties such as size or layer thickness. Typically, the material properties are then related or correlated to other parameters of interest, such as the stress, strain, or load on the material.

Figure 6:
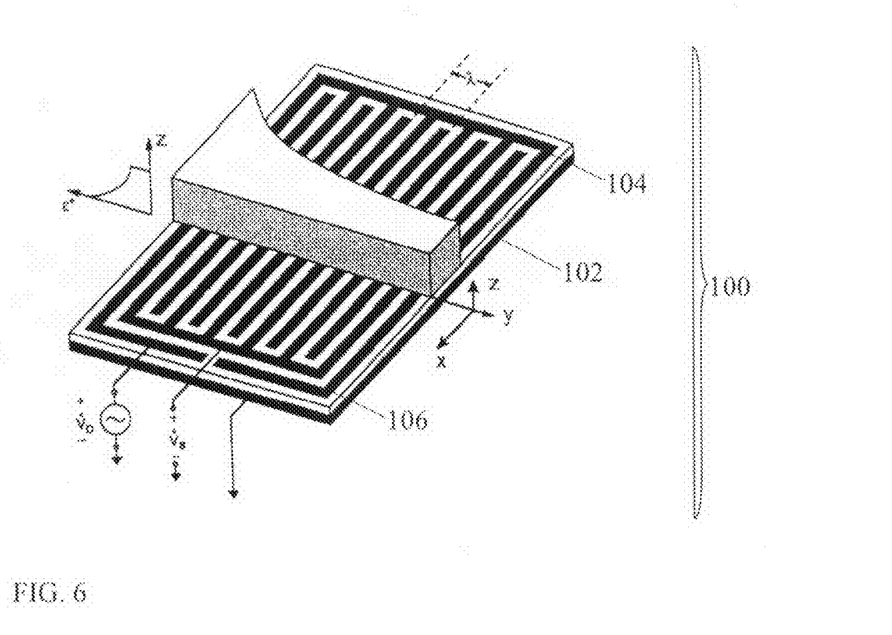
FIG. 6 shows a representative single wavelength interdigitated electrode dielectrometer with spatially periodic driven and sensing electrodes that can measure dielectric properties of the adjacent material.

A representative single sided sensor geometry is shown in FIG. 6. The application of a sinusoidally time varying potential of angular frequency $\omega=2\pi f$ results in the flow of a terminal current, whose magnitude and phase is dependent on the complex permittivity of the material. The capacitive sensor 100 has interdigitated electrodes as presented in U.S. Pat. Nos. 4,814,690, 6,380,747, 6,486,673 and 6,781,387. This sensor 102 utilizes a pair of interdigitated electrodes 104 and 106 to produce a spatially periodic electric field. The electrodes are adjacent to the material of interest with an insulating substrate and a ground plane on the other side of the substrate. One of the two electrodes, 104, is driven with a sinusoidally varying voltage $v_D$ while the other, 106, is connected to a high-impedance buffer used to measure the magnitude and phase of the floating potential $v_S$ or to a virtually grounded amplifier to measure the magnitude and phase of the terminal current. The periodicity of the electrode structure is denoted by the spatial wavelength $\lambda$. For layered media or materials having dielectric properties that vary with depth, the measured transadmittance between the drive and sense electrode, or the effective complex permittivity of the material, is a thickness and depth-weighted response of the dielectric properties of the various regions. Typical excitation frequencies range from 0.005 Hz for highly insulating materials to 10 MHz or higher for semiconducting materials.

For the interdigitated electrode dielectrometer of FIG. 6, the depth of penetration of the electric field into the material is proportional to the spatial wavelength of the periodic electrodes. The electric scalar potential in the materials above and below the sensor obeys Laplace's equation. In Cartesian coordinates with linear lossy dielectrics the potential can be written as an infinite series of sinusoidal Fourier modes of fundamental spatial wavelength $\lambda$ that decays into the medium the z direction. The periodic variation of electric potential along the surface in the y direction produces an exponentially decaying electric field that penetrates into the medium in the z direction. The depth of sensitivity is considered to be approximately ⅓ of the fundamental spatial wavelength. This implies that small wavelength sensors will primarily respond to changes of material properties near the sensor-material interface, while larger wavelength sensors respond to changes farther from the sensor interface. Thus multiple wavelength sensors can be used to measure spatial profiles of dielectric properties; the necessary information to estimate multiple unknowns with these sensors can be accomplished via different spatial wavelengths or segmented fields.

In one mode of operation for the system of FIG. 1, the sensors are magnetic field sensors and a data acquisition unit is used to excite multiple sensors with a single drive. Note that it is assumed that each sensor has at least one sensing element but similar results can be achieved if a single array of sense elements is wrapped around the outside surface of the ring gear as well. For sensors with directional sensitivity, such as the sensor in FIG. 2, the longer segments of the drive conductors for each individual sensor are dominantly aligned in one direction to enable estimation of the magnetic permeability in the direction perpendicular to the longer drive segments. These directional permeability measurements can then be related to stress in the material at each sensor location. When exciting the multiple sensors, it is preferred to have the drive series connected (as one drive) so that the sensor responses are synchronized with each other and the instrumentation acquires data in parallel from each sensor or sensing element within a sensor at essentially the same time intervals. The sampling rate or data acquisition rate is selected to be fast enough to observe a specific dynamic change in the stress of a material under test, and the output of the sensor is recorded to enable observations regarding the condition, function or states of the material under examination. For example, with two sensors located around the circumference the sampling needs to be at a sufficient rate to estimate the peak stress or loads on individual posts. Note that when the data sampling is intentionally not synchronized with the rotation speed, each additional rotation or turn of the component provides data at another rotational position, effectively increasing the circumferential sampling density.

In practice, for magnetic field sensors the applied current or excitation frequency is as high as possible to support high data sample rates but still allows the fields to penetrate through any coating or surface layers. For example, a 4 MHz excitation frequency might enable a 400 kHz sampling rate assuming negligible integration times and overhead times for data storage and processing. In an implementation, with an excitation frequency of 100 kHz to 1 MHz with an integration time of 0.64 ms, a sampling rate of about 250 Hz is obtained.

For rotating cylindrical components, the sensors can be mounted around the component in a variety of ways. Typically, even though the component of interest is rotating the sensors are kept stationary. For example, the sensors can be mounted in a non-contact configuration where an air gap is intentionally introduced or maintained so that there is no direct contact between the sensor and the test material. As another example, the sensors are mounted to a ring that encircles the rotating component. The sensors may be placed around the entire circumference of the ring or only at several discrete locations. Then, at each measurement time each sensor will reflect the interaction between the ring and rotating component at a specific rotational position. Subsequent measurements are generally taken at other rotational positions since the rotation rate and data acquisition rates are generally not synchronized. The output of the sensors can be used to detect a misalignment of the rotating body through its interaction with the ring material, may be used to adjust the balance, and can even determine if a component is operating within an acceptable range of stress variation. Note that the sensors can be bonded to the surface using an adhesive or epoxy. Alternatively, the sensors can be mounted on a substrate are routed around a closed loop and tightened without a bonding material to monitor stress or strain and then removed without affecting the object under test or requiring significant surface preparation.

Similarly the measurement of the sensor or sense element responses can be performed in a variety of ways. For example, for magnetic field sensors, the drive windings can be series connected so that each sensor is active at the same time. However, if a large number of sensors are to be monitored, the sensors can be grouped to have a common drive and monitored by separate electronics modules within each group. Groups of individual sense elements within a sensor array may also be connected together to increase the sense area. This reduces the number of sense areas that need to be monitored and permits averaging of the stress or strain, avoids effects of local property variations, and can improve the signal-to-noise ratio. Multiplexing between the sense elements or groups of sense elements enables monitoring of even more sensors for a given instrument having a limited number of data acquisition channels, but this dilutes the ability to monitor all channels simultaneously.

In operation, the sensors can be used for long-term monitoring or short-term diagnosis of performance. Permanently mounted sensors are left in place for long periods of time and used for monitoring during operation or for convenient examinations. The sensors are typically mounted in difficult-to-access locations with cables routed to easy access locations. On-board electronic instrumentation may be used for continuous monitoring while off-board portable electronics can occasionally be plugged into the cables to obtain the sense element responses. In contrast, for short-term diagnosis, the sensors are mounted in a temporary fashion, such as with a weak bond or adhesive material, and on-board instrumentation is used to record data for short periods of vehicle operation, such as during a flight of a rotary wing aircraft. This allows the condition of the vehicle to be monitored for diagnostic purposes, but the sensors and instrumentation can be removed and even reused on another vehicle.

Also, in operation, the calibration of the sensors can be performed in a variety of ways. For sensors that have a response which can be accurately modeled, for example with the measurement grids of FIG. 3 and FIG. 4, measurements of the sensor response in air may be sufficient to adjust the instrument settings so that reliable property measurements can be obtained. Alternatively, one or more measurements with the sensor against a reference material, such as the outside surface of the ring gear with and without a shim between the ring and a magnetic field sensor, can be used to make these instrument adjustments. The material properties determined by the sensors can in-turn be related to the stress or strain through coupon measurements. This relation can be obtained by applying a prescribed load to a coupon with one or more sensors mounted on the coupon. Alternatively, the relation could be obtained from controlled loads applied to a component resembling the application of interest with one or more of the mounted to it. In both cases, a strain gage can be mounted temporarily on the test material during loading to verify the loads being applied. While the above discussion emphasized the relation between a material property and the stress, strain, and load, empirical relationships between the sensor response and the state of interest can be stored to convert the sensor output to the desired state measurement for each sensor. Note also that thermocouples can be added to the measurement system to enable correction for temperature variations.

Figure 7:
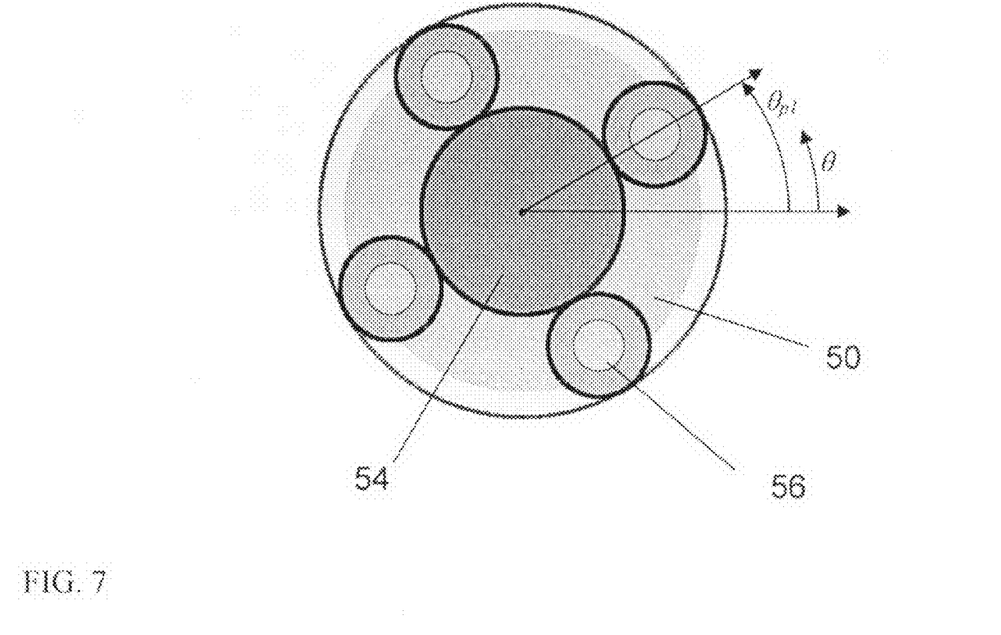
FIG. 7 shows a planetary gear with four planets.

As a further discussion regarding the selection of the number of sensors, the measurement time intervals, and the placement of the sensors around the rotating member, consider the geometry of FIG. 7. It is assumed that multiple magnetic stress gages are positioned around the circumference of the ring gear in a planetary gear sub-system of a rotorcraft main drive train to provide a direct measurement of stresses around the planetary gear circumference. In this case, the goal is to estimate the stresses on the individual planet posts of the carrier plate based on the stresses measured by the magnetic stress gages. More specifically, the sensors are located at i positions around the circumference of the ring gear and measurements are made at a rate of j times per rotation. While the j times will typically be different for each rotation, the actual time and relative position of the rotating carrier plate can be determined, for example, by measurement of the main rotor shaft position using a separate sensor. In this situation, additional data regarding the stresses on each post can be obtained by the time sampling of the stresses as a function of rotor shaft and associated carrier plate position. This accumulation of the data with time increases the density of the stress data with respect to the carrier plate position and permits a very high effective sampling of the signal.

To illustrate the relation between the stress measurements and the stress on each post, assume that the planetary gear has four planets as shown in FIG. 7. The stress on each post is assumed to be periodic with the angular position with period $2\pi$. This stress can be expressed in terms of a general Fourier series as $$F_i(\theta_{pi}) = a_{io} + \sum_{m=1}^{\infty} b_{im}\cos(m\theta_{pi}) + \sum_{m=1}^{\infty} c_{im}\sin(m\theta_{pi}) \qquad (1)$$

where $\theta_{pi}$ is the angle of the ith post. The coefficient $a_{io}$ represents the average stress, and $b_{im}$ and $c_{im}$ represent the amplitudes of the mth harmonics of the stress on the ith post. For simplicity, assuming a highest harmonic h allows the series to be truncated. This reduces the Fourier series expression to $$F_i(\theta_{pi}) = a_{io} + \sum_{m=1}^{h} b_{im}\cos(m\theta_{pi}) + \sum_{m=1}^{h} c_{im}\sin(m\theta_{pi}) \qquad (2)$$

Figure 8:
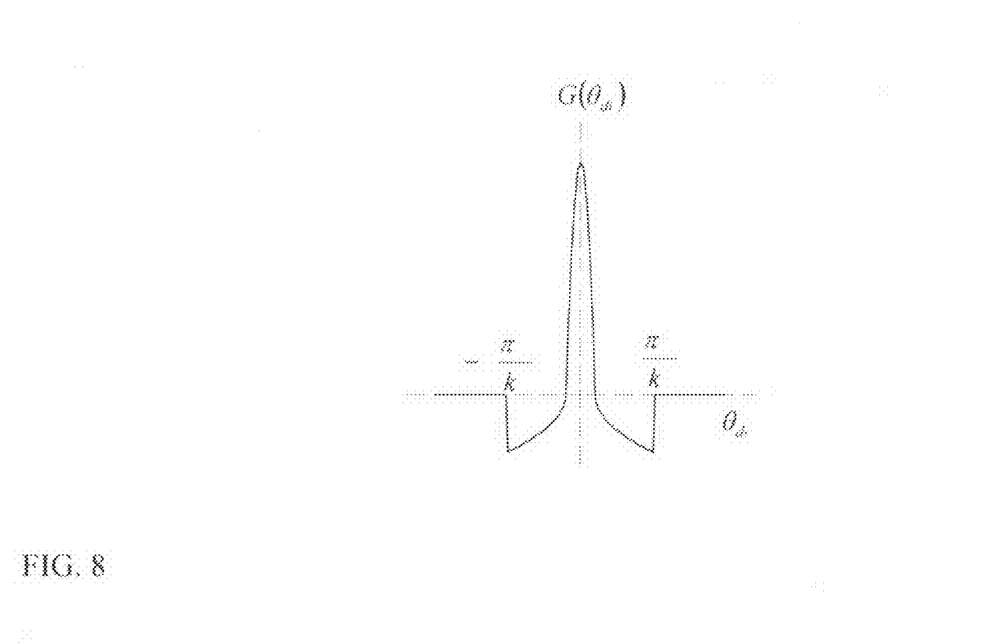
FIG. 8 shows a plot of the stress associated with each post.

The stress around the circumference of the ring due to the planet is known, via finite element modeling, and varies according to the circumferential distance from the point of contact between the planet and the ring, $\theta_{di}=\theta-\theta_{pi}$ (ignoring the radius). A plot illustrating an arbitrary stress profile is shown in FIG. 8. The stress from each planet is assumed to be within an angular distance of $\pi/k$ (for $\theta_{di}$ from $-\pi/k$ to $\pi/k$), where k is the number of planets or posts on the plate.

The total stress around the ring can be obtained as a superposition of the contributions from each of the planets. Each planet's contribution to the total stress is proportional to the stress on its post multiplied by the typical stress profile that results on the ring due to a planet $G(\theta_{di})$. The ring stress can be expressed as the superposition of the stresses from all the planets as $$\sigma(\theta) = \sum_{i=1}^{k} \{F_i(\theta_{pi})G(\theta-\theta_{pi})\} \qquad (3)$$

$$= \sum_{i=1}^{k} \left\{ \left( a_{io} + \sum_{m=1}^{h} (b_{im}\cos(m\theta_{pi}) + \right.\right.$$

$$\left.\left. c_{im}\sin(m\theta_{pi})) \right) G(\theta-\theta_{pi}) \right\}$$

The vector of coefficients used to represent the stresses on the posts can be written out as a vector of unknowns as $$x = [a_{10}\, b_{11}\, c_{11}\, b_{12}\, c_{12}\, \ldots\, b_{1h}\, c_{1h}\, a_{20}\, b_{21}\, c_{21}\, b_{22}\, c_{22}\, \ldots\, b_{2h}\, c_{2h}\, \ldots\, a_{k0}\, b_{k1}\, c_{k1}\, b_{k2}\, c_{k2}\, \ldots\, b_{kh}\, c_{kh}]^T \qquad (4)$$

The number of coefficients or unknowns is equal to n=(1+2h)k where the 1 corresponds to the constant or DC term of the Fourier series for each post, h is the highest harmonic present in the post stress function and k is the number of posts or planets. Letting $$r = [G_1\, G_1\, \ldots\, G_1\, G_2\, G_2\, \ldots\, G_2\, \ldots\, G_k\, G_k\, \ldots\, G_k] \qquad (5)$$

be a 1 by n row vector where $G_i = G(\theta-\theta_{pi})$ and letting $$B = \mathrm{diag}[1\, K_{11}\, S_{11}\, K_{12}\, S_{12}\, \ldots\, K_{1h}\, S_{1h}\, 1\, K_{21}\, S_{21}\, K_{22}\, S_{22}\, \ldots\, K_{2h}\, S_{2h}\, \ldots\, 1\, K_{k1}\, S_{k1}\, K_{k2}\, S_{k2}\, \ldots\, K_{kh}\, S_k] \qquad (6)$$

be an n by n diagonal matrix where $K_{ij}=\cos(j\theta_{pi})$ and $S_{ij}=\sin(j\theta_{pi})$, then the stress at a particular location on the ring can be expressed as $$\sigma(\theta) = rBx \qquad (7)$$

In this formulation, there are n unknowns, and therefore, n equations are needed to solve for them. The equations can be written in matrix form as $$y = Ax \qquad (8)$$

where $$y = [\sigma(\theta_1)\, \sigma(\theta_2)\, \ldots\, \sigma(\theta_n)]^T \qquad (9)$$

is a vector of stresses at n locations that are used to form n equations in n unknowns. The matrix A is the product of two matrices:

$$A = RB \qquad (10)$$

where $$R = \begin{bmatrix} G_{11} & G_{11} & \cdots & G_{11} & G_{12} & G_{12} & \cdots & G_{12} & \cdots & G_{1k} & G_{1k} & \cdots & G_{1k} \\ G_{21} & G_{21} & \cdots & G_{21} & G_{22} & G_{22} & \cdots & G_{22} & \cdots & G_{2k} & G_{2k} & \cdots & G_{2k} \\ \cdots & \cdots & \cdots & \cdots & \cdots & \cdots & \cdots & \cdots & \cdots & \cdots & \cdots \\ G_{n1} & G_{n1} & \cdots & G_{n1} & G_{n2} & G_{n2} & \cdots & G_{n2} & \cdots & G_{nk} & G_{nk} & \cdots & G_{nk} \end{bmatrix} \qquad (11)$$

is an n by n matrix where $$G_{ij} = G(\theta_i - \theta_{pj}) \qquad (12)$$

Without knowledge of the rank of A, one might assume A has full rank and expect to place n sensors at n locations around the circumference in order to obtain and solve the n equations at one point in time using one measurement. However, R actually has only k independent columns since the rank of R is equal to k or the number of planets. Therefore, the matrix A (product of R and B) only has rank k and Equation (8) will be underdetermined and not have a unique solution when using n sensors at one point in time. At any point in time, the k sensors will yield k independent equations. In order to obtain the n equations required, one needs to use measurements made during at least n/k times for the k sensors. Since, the coefficients do not have to be calculated instantaneously using just one measurement, several measurements made over time can be utilized to complete the matrix of rank n. Assuming k sensors, the solution is obtained by making at least $$q = \frac{n}{k}$$

measurements. The full rank matrix that will have a solution is then formed as $$y = \begin{bmatrix} \sigma(\theta_1, t_1) \\ \sigma(\theta_2, t_1) \\ \vdots \\ \sigma(\theta_k, t_1) \\ \sigma(\theta_1, t_2) \\ \sigma(\theta_2, t_2) \\ \vdots \\ \sigma(\theta_k, t_2) \\ \vdots \\ \sigma(\theta_1, t_q) \\ \sigma(\theta_2, t_q) \\ \vdots \\ \sigma(\theta_k, t_q) \end{bmatrix} = \begin{bmatrix} A_1 \\ A_2 \\ \vdots \\ A_q \end{bmatrix} x \quad (13)$$

where $$A_i = R_i B_i \quad (14)$$

is a k by n matrix formed using the ith measurement (time $t_i$). $R_i$ has dimensions k by n, and $B_i$ is n by n. Both are evaluated at time $t_i$. The maximum useful number of sensors at any point in time (disregarding noise reduction with increasing number of sensors, etc.) is k. The minimum number of sensors needed is equal to 1 with measurements made during at least n times.

Using a magnetic stress gage, the number of measurement times per cycle is dependent on the data acquisition time, which depends on the integration time and other overhead processing time, and the duration of each cycle, which depends on the angular velocity of the planet carrier. Since the duration of each cycle is typically only a fraction of a second, measurements over several cycles can be used. Since the data acquisition times are not synchronous with the planet carrier rotation, data acquired during different cycles will be based on different planet carrier locations and effectively a higher sampling rate can be achieved. The additional measurements made during different cycles will not be redundant.

The following is an example where the planetary gear has four planets. The highest harmonic is assumed to be the fundamental. A possible scenario for such a post stress profile is when the sun gear is not concentric with the ring gear. The stress at any particular location is $$\sigma(\theta) = \sum_{i=1}^{4} \{F_i(\theta_{pi}) G(\theta - \theta_{pi})\} \quad (15)$$

$$= \sum_{i=1}^{4} \{(a_{io} + b_{i1}\cos(\theta_{pi}) + c_{i1}\sin(\theta_{pi}))G(\theta - \theta_{pi})\}$$

which can be expressed as $$\sigma(\theta) = (a_{1o} + b_{11}\cos(\theta_{p1}) + c_{11}\sin(\theta_{p1}))G(\theta - \theta_{p1}) + \quad (16)$$
$$(a_{2o} + b_{21}\cos(\theta_{p2}) + c_{21}\sin(\theta_{p2}))G(\theta - \theta_{p2}) +$$
$$(a_{3o} + b_{31}\cos(\theta_{p3}) + c_{31}\sin(\theta_{p3}))G(\theta - \theta_{p3}) +$$
$$(a_{4o} + b_{41}\cos(\theta_{p4}) + c_{41}\sin(\theta_{p4}))G(\theta - \theta_{p4})$$

or $$\sigma(\theta) = [\, G_1 \ G_1 \ G_1 \ G_2 \ G_2 \ G_2 \ G_3 \ G_3 \ G_3 \ G_4 \ G_4 \ G_4 \,] \times \quad (17)$$

$$\begin{bmatrix} 1 & 0 & 0 & 0 & 0 & 0 & 0 & 0 & 0 & 0 & 0 & 0 \\ 0 & K_{11} & 0 & 0 & 0 & 0 & 0 & 0 & 0 & 0 & 0 & 0 \\ 0 & 0 & S_{11} & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & K_{21} & 0 & 0 & 0 & 0 & 0 & 0 & 0 \\ 0 & 0 & 0 & 0 & 0 & S_{21} & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & K_{31} & 0 & 0 & 0 & 0 \\ 0 & 0 & 0 & 0 & 0 & 0 & 0 & 0 & S_{31} & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & K_{41} & 0 \\ 0 & 0 & 0 & 0 & 0 & 0 & 0 & 0 & 0 & 0 & 0 & S_{41} \end{bmatrix} \begin{bmatrix} a_{1o} \\ b_{11} \\ c_{11} \\ a_{2o} \\ b_{21} \\ c_{21} \\ a_{3o} \\ b_{31} \\ c_{31} \\ a_{4o} \\ b_{41} \\ c_{41} \end{bmatrix}$$

which is basically in the form of Equation (7). In this case, there are 12 unknowns. The matrix equation formed by evaluating the stress function at 12 locations can be expressed in the form of Equation (8). The matrix A=RB has rank 4 since there are only 4 independent columns in R. Therefore, the matrix A will have to be formed using measurements during at least 3 times. Using more than 3 measurements will result in an overdetermined matrix equation whose best solution can be obtained using least squares techniques.

The statistics of the coefficients or parameters being estimated can be obtained if the statistics of the stress gages is known. Let $$C = (A^T A)^{-1} A^T \quad (18)$$

be the pseudoinverse of A which yields the best solution in the least squares sense. Therefore $$x = Cy \quad (19)$$

If the covariance matrix of the stress gages is known, the covariance matrix of the coefficients can be obtained via the following relation $$\Lambda_x = C \Lambda_y C^T \quad (20)$$

where $\Lambda_y$ is the covariance matrix of the stress gages, and $\Lambda_x$ is the covariance matrix of the coefficients. Typically, the noise of the stress gages are independent of each other and $\Lambda_y$ is diagonal and simply composed of the variances of each of the stress gages. If it is assumed that all of the stress or strain gages have the same characteristics, then $\Lambda_y$ is diagonal with equal elements (variances) along the diagonal as $$\Lambda_y = \begin{bmatrix} \sigma_y^2 & 0 & 0 & 0 \\ 0 & \sigma_y^2 & 0 & 0 \\ 0 & 0 & \ddots & 0 \\ 0 & 0 & 0 & \sigma_y^2 \end{bmatrix} \quad (21)$$

and the covariance matrix of coefficients is $$\Lambda_x = \sigma^{y2} CC^T \quad (22)$$

The noise of each sensor, which is assumed to have standard deviation $\sigma_y$, varies with the sensor type, as well as the integration time. As the integration time (and corresponding data acquisition time) decreases, the variance increases. However, since the data acquisition time is relatively short, more measurements per period can be obtained. More measurements per period tends to decrease the standard deviation of the obtained coefficients. The data acquisition time, therefore, presents a trade-off.

To determine the appropriate number of magnetic stress gages to place around the ring, the trade-offs between cost and performance need to be considered. A significant portion of the cost is often associated with the number of sensors or sensing elements to be used, so it is desirable to determine the minimal number of sensors required for sufficient observability that supports the diagnostics objective. The performance can be measured using the standard deviations of the coefficients, which can be obtained from $\Lambda_x$, and the ratios of the coefficients to their respective standard deviations. This is analogous to calculating the signal-to-noise ratios for the measurements.

As shown earlier, from the analysis, only k sensors are useful at one point in time for determining the coefficients. More sensors, however, lead to lower errors in the coefficients. Next, the preferred placement of sensors around the circumference of the ring for improved performance needs to be determined. The analysis to determine the optimal sensor placement also provides information about the statistics of the estimated coefficients variation with the number of sensors used, the sensor placement, and the number of measurements made per period made and associated data acquisition time.

Figure 9:
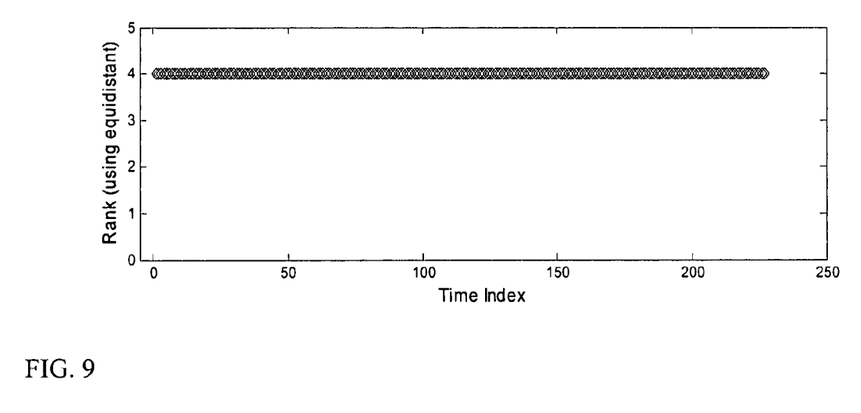
FIG. 9 shows a plot of the rank of the submatrices for equidistant sensors over a period of revolution for a planetary gear with four posts.
Figure 10:
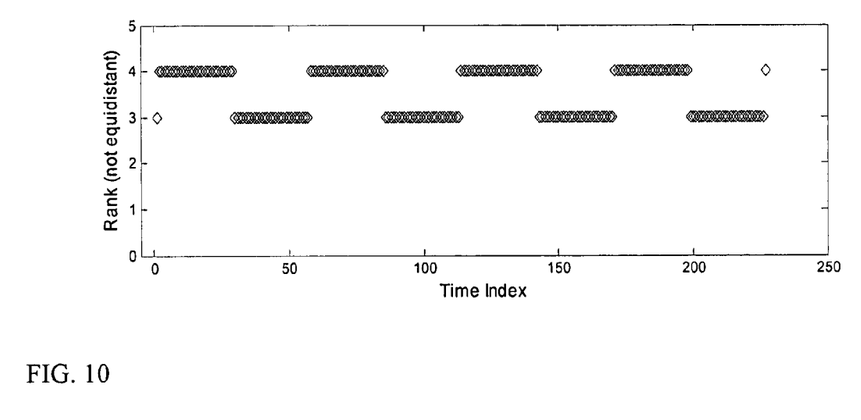
FIG. 10 shows a plot of the rank of the submatrices for non-equidistant sensors over a period of revolution for a planetary gear with four posts.

If the number of sensors is a multiple of the number of posts, the optimal layout has the sensors equally spaced around the circumference. For each point in time, the rank of the submatrix $A_i$ in Equation (14) can be calculated for equidistant sensors and compared with the rank calculated for non-equidistant sensors. For example, FIG. 9 shows a plot of the ranks of the submatrices for equidistant sensors over a period of revolution while FIG. 10 shows a plot of the ranks of the submatrices for non-equidistant sensors over a period of revolution, where the last sensor placed at the midpoint between its original equidistant layout location and the first sensor. This simulation was performed assuming a planetary gear system with 4 planets, and with $a_{i0}=100$, $b_{i1}=10$, $c_{i1}=10$ for each of the planets. The matrix derived from equidistant sensors maintains a rank of 4, which is equal to k, for the entire period while the matrix formed from the non-equidistant layout has a rank that varies between 4 and 3. It follows that if k sensors are used and not equally placed around the circumference, the rank of the submatrix $A_i$ per measurement does not always remain at its maximum of k. Note that it is possible to form a full rank matrix A of rank 12 using a non-equidistant layout by increasing the number of measurements until a full rank matrix is formed. For example, three rank 4 matrices, or three measurements, can form a rank 12 matrix as long as it is also known at which times the matrix has full rank. However, the preferred option which avoids these concerns is to equally space the sensors around the circumference of the ring.

Figure 11:
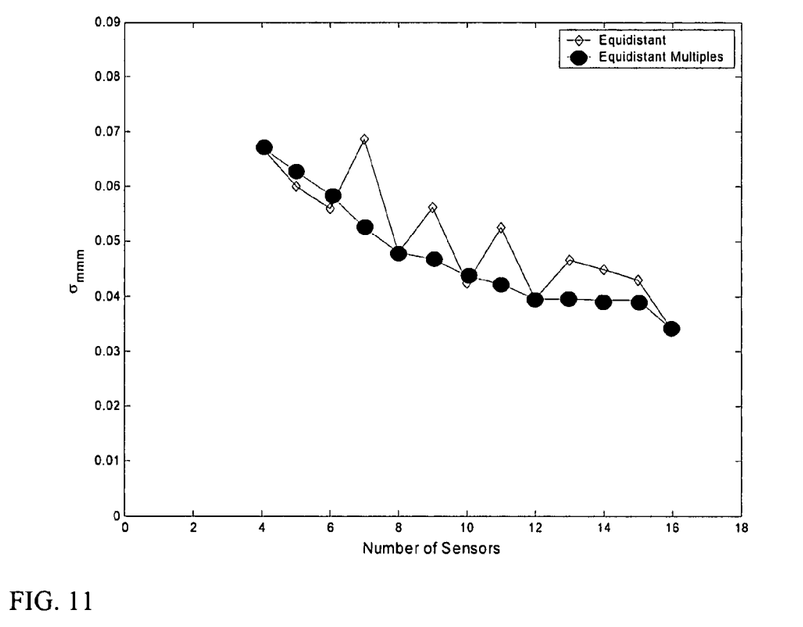
FIG. 11 shows a plot of the maximum standard deviation of the coefficient, minimized over the first measurement shift and measurements, for equidistant sensors and equidistant multiples of post counts for a planetary gear with 4 posts.
Figure 12:
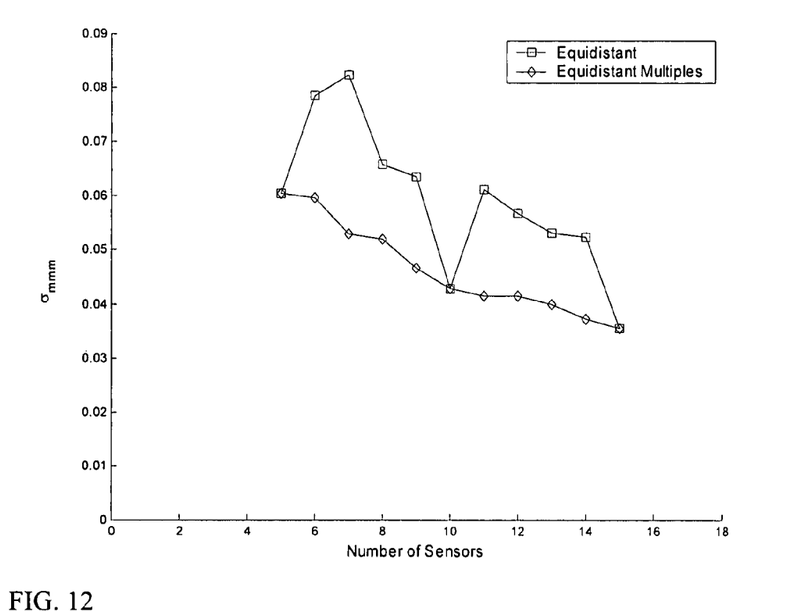
FIG. 12 shows a plot of the maximum standard deviation of the coefficient, minimized over the first measurement shift and measurements, for equidistant sensors and equidistant multiples of post counts for a planetary gear with 5 posts.

When the number of sensors is not a multiple of the number of posts, it is most often the case that the optimal placement of the sensors is to have $$n_e = \left\lfloor \frac{n_s}{k} \right\rfloor k$$

sensors equally spaced around the circumference of the circle and the remaining sensors placed at the midpoints between already placed sensors. In other words, the optimal layout involves placing the next highest number of sensors that is a multiple of the number of posts (k) at equidistant locations and the rest at the midpoints between equidistant sensors. To illustrate this, consider a performance metric based on the maximum standard deviation among all of the coefficients after minimizing by varying the number of measurements and the time shift to the first measurement and denoted by $\sigma_{mmm}$. FIG. 11 shows a plot of this maximum standard deviation for each number of sensors. The curve labeled "equidistant multiples" corresponds to the layout where, when the number of sensors is not a multiple of the number of posts, the next highest multiple of sensors are equally spaced while the remaining sensors are placed in between the equally spaced sensors. As can be seen in FIG. 11, for sensor counts above 6, placing the sensors in the "equidistant multiple" layout generally lowers the standard deviation of the coefficients. For example, given 9 sensors, it is better to place 8 equally spaced around the circumference and then place the remaining sensor at the midpoint between any two sensors. This is better than placing all 9 of them equidistant around the ring. Using an "equidistant multiple" layout is also preferred for higher post counts such as the case with 5 posts as shown in FIG. 12.

Figure 13:
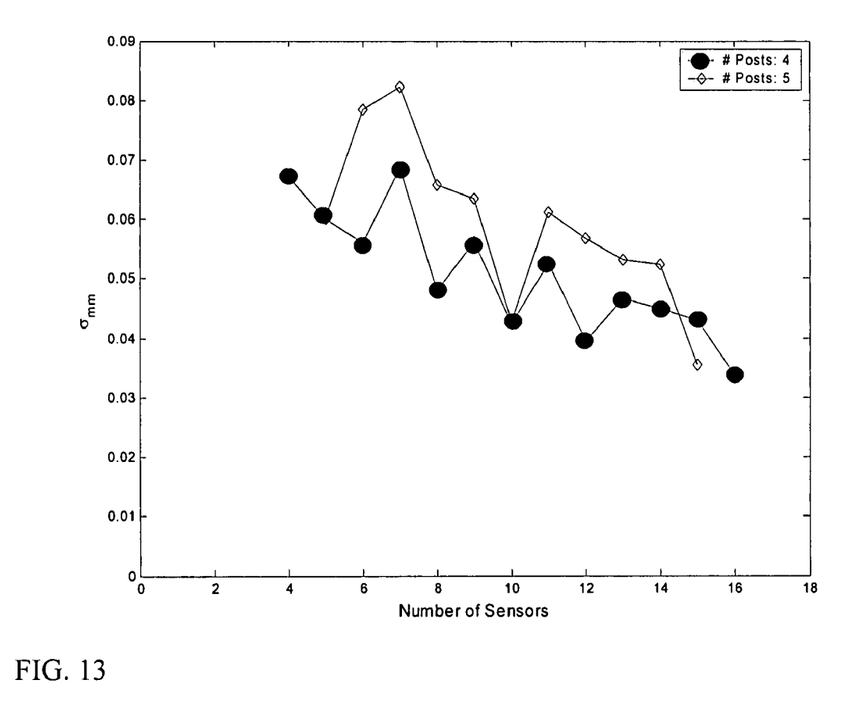
FIG. 13 shows a plot of the maximum standard deviation of the coefficient, minimized over the first measurement shift.

As shown by this observation, having sensor numbers that are multiples of the number of posts is naturally preferred and more optimal than sensor counts that are not multiples of the number of posts. Shown in FIG. 13 are plots of $\sigma_{mm}$, the maximum coefficient standard deviation minimized over the time shift to the first measurement, where the sensors are equally spaced around the circumference. The local minima occur when the number of sensors is a multiple of the number of posts. For four posts, there are local minima when the number of sensors is 8, 12, and 16. Note that there are also local minima for 6 and 10 sensors. The local minima observation is more pronounced for higher planet post numbers. For 5 posts, the local minima occur for 5, 10, and 15 sensors as shown in FIG. 13. This progression also continues for higher multiples of 5.

Figure 14:
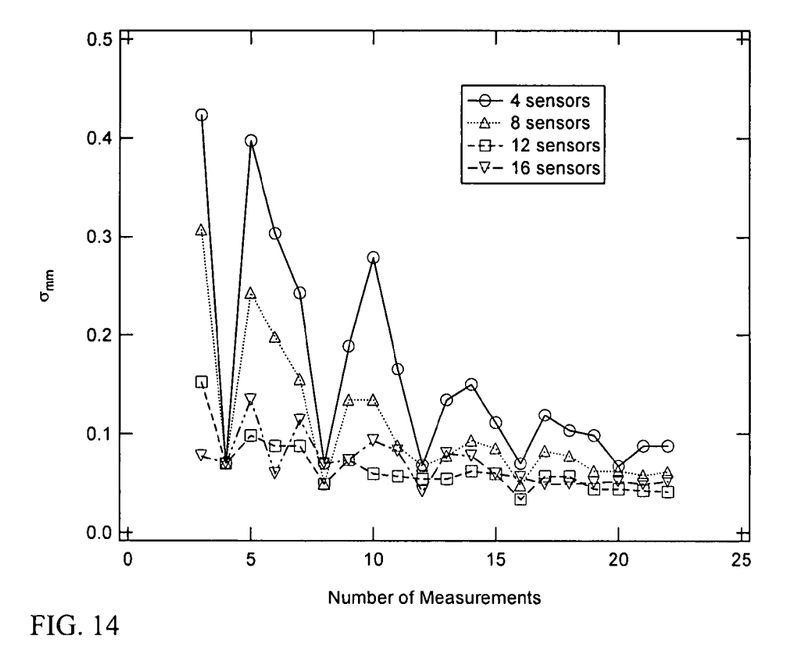
FIG. 14 shows a plot of the maximum standard deviation of the coefficient, minimized over the first measurement shift, for several numbers of sensors.

When the number of sensors is a multiple of the number of posts, some other patterns emerge for $\sigma_{mm}$. There are local minima for $\sigma_{mm}$ when the number of measurements equal multiples of the number of posts. For example, for a planetary gear with four posts and where four sensors are used, it is better to use 4 measurements than 7 as shown in FIG. 14. Optimum conditions, where the maximum in the standard deviation is as small as possible, occur when the measurements are equally spaced in time and the time shift for the first measurement can be anywhere from zero to the interval between measurements.

The best measurements times used are such that they divide the entire period into equal time intervals. As shown in FIG.

14, increasing the number of measurements generally lowers $\sigma_{mm}$, ignoring momentarily the fact that the number of measurements that are multiples of the number of sensors also have a lower $\sigma_{mm}$. In addition, the data acquisition time for the electronic instrumentation performing the measurements on the sensors, such as the magnetic stress gages, can typically also be set. Generally, decreasing the data acquisition time increases the the number of measurements that can be acquired and used per period. However, the noise in the measurement or the standard deviation in the measurement also increases as the data acquisition time decreases. In effect, the diagonal elements of $\Lambda_y$ increase, which then increase the elements of $\Lambda_x$. The optimum data acquisition time is obtained based on knowledge of actual sensor noise characteristics as they vary with acquisition time. In equation terms, $CC^T$ of Equation (22) decreases (normwise) with increasing measurements. However, $\sigma_y$ increases with the shorter acquisition time that enables more measurements. The value of $\sigma_{mm}$ is determined with these two opposing factors. The solution to the problem of minimizing $\sigma_{mm}$ involves using more measurements from several periods while keeping $\sigma_y$ the same and not having to decrease the acquisition time to obtain more measurements per period. This results in a decrease in $CC^T$ (normwise) while maintaining $\sigma_y$. This is possible when the measurement times are not synchronous with the planet positions, which is most often the case. In addition, the appropriate acquisition time can be selected to ensure that the planet positions are asynchronous with the measurement times.

Figure 15:
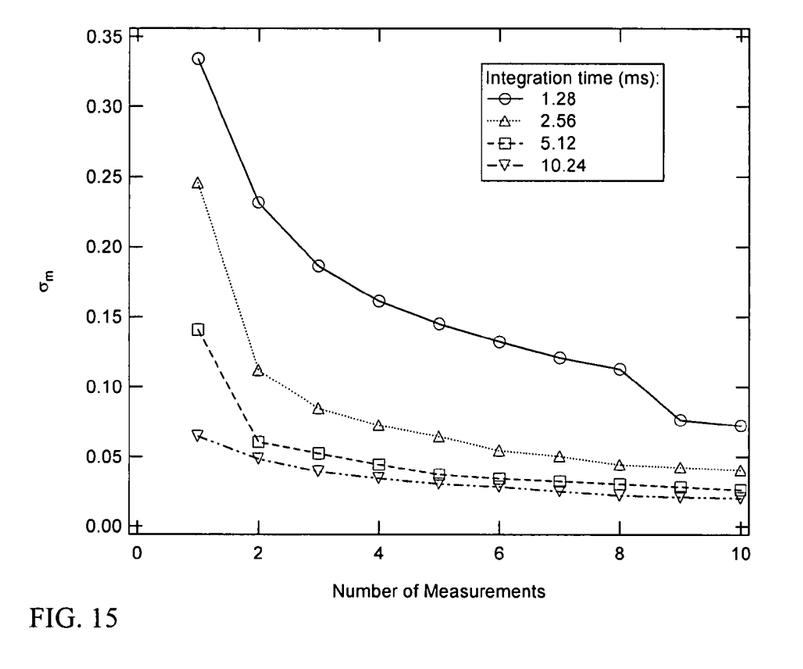
FIG. 15 shows a plot of the maximum standard deviation among coefficients, using all of the measurements per period, for several integration times.
Figure 16:
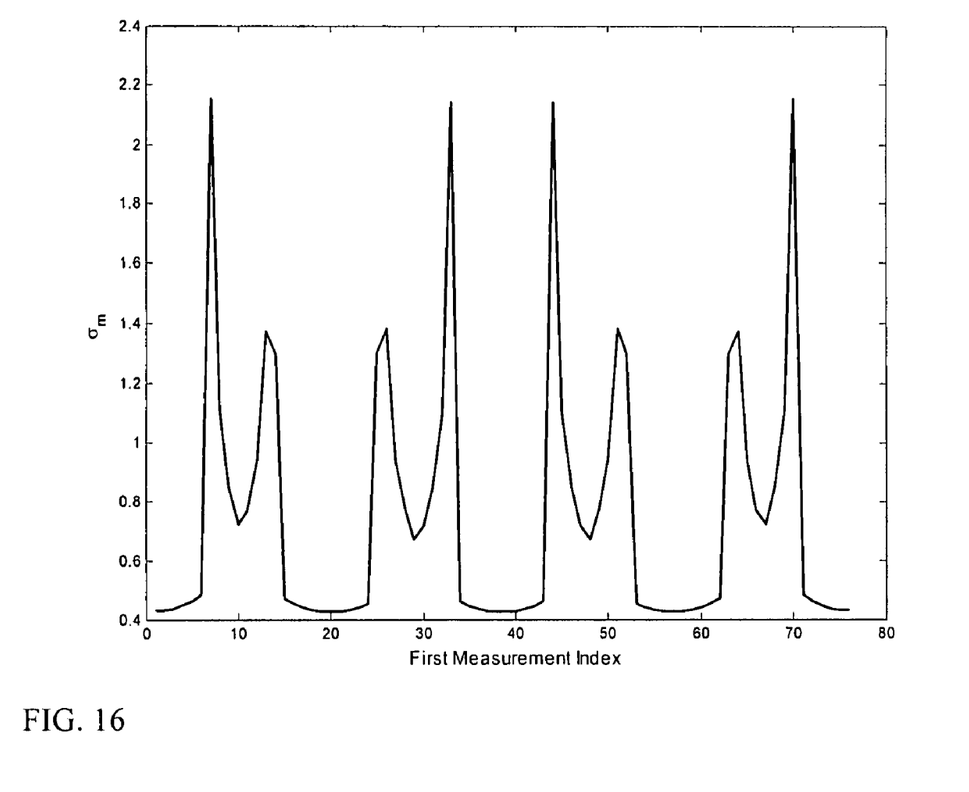
FIG. 16 shows a plot of the maximum standard deviation of coefficients versus index number of the first measurement. The maximum index number corresponds to the time interval between two measurements, assuming 4 sensors and 3 measurements.

To illustrate this effect, a simulation was performed with a planetary gear having 4 planet posts and 4 sensors with different data acquisition times. The maximum number of measurements per period was used that corresponds to an actual sensor (first measurement occurs after a measurement time interval) for several data acquisition times. The plot in FIG. 15 shows that as the number of periods increases, the standard deviation decreases. Note that this analysis assumed $\sigma_y$ equal to 1. Ideally, if one could select measurement times to be equally spaced apart and continuously within the period, the optimal time for the first measurement is such that it results in the posts being aligned with the sensors during one measurement time, if the number of sensors is equal to the number of planet posts, or at least one post is aligned with a sensor, when number of posts is not equal to number of sensors, for one measurement. This is shown in FIG. 16 where the simulation was performed with four sensors and three measurement times. The vertical axis is $\sigma_m$, the maximum standard deviation of the coefficient. The plot shows that the best shift times are at fractions of 0 (or 1), ¼, ½, ¾, of the interval between two measurements. Given these shifts, the posts will be aligned with the sensors for one of the three measurement times.

Simulations were also performed over ranges in the numbers of sensors and measurement numbers. In this case, the number of sensors varied from 4 to 16 and the number of measurements varied from 3 to 22. The maximum of 22 was assumed if for example, the shortest data acquisition time is 2.56 ms. Longer integration times correspond to fewer measurements. The measurements were equally spaced and the first measurement was allowed to shift anywhere between 0 and the interval between two measurements. Generally, $\sigma_{mm}$ decreases with increasing number of sensors and measurements. Similar to FIG. 14 the decrease in $\sigma_{mm}$ with increasing sensor number is not monotonic.

In the preceding analysis, a parameterized functional form was used to represent the stress on each post with parameters defining the mean stress and the amplitude of each sinusoidal harmonic. The stress on each post was parametrically related to the stress on the ring gear, which can be measured and used to estimate the parameters. For example, if three parameters represent the sinusoidal stress distribution on each post and there are five posts, then fifteen unknowns must be estimated. This would require at least fifteen measurements. This could be accomplished with three magnetic stress gages equally spaced around the circumference of the ring gear and with measurements taken at five times per rotation. This is the minimum number of measurements needed to estimate the fifteen unknowns. To correct for noise, redundancy in the data is preferred, either with more than three locations monitored, more than five measurement times, or both used in practice. This greater number of sensors and/or measurement times will improve the confidence level in the parameter estimates. Note that the stress on the individual planet posts can be represented by a combination of a mean stress and a sinusoidal stress. In particular embodiments, the sinusoidal stress is the dominant mode or the dominant mode with higher order harmonics. Note also that while this example emphasized the use of magnetic stress gages, conventional sensors such as strain gages could also be used.

While the model above was based on the stress on the planet posts, models for the dynamic and kinematic behavior of the drive train and other rotorcraft structural and dynamic systems can be added to the simulation of the rotorcraft behavior. For example, the stresses, temperatures, or other state variations for the drive train or other structural component can be incorporated into the analysis so that the measurement sensors can be used to estimate the state of the system. An efficient approach for performing this parameter estimation is to generate a database of responses spanning the dynamic range of interest for each unknown state or parameter of interest, similar that of FIG. 3 and FIG. 4. This precomputed data base can be stored as a grid, lattice, or hypercube so that a rapid table look-up can be used to estimate the unknown parameter values in real time. This rapid determination of the unknown parameters allows designers to visualize the impact of design changes in real-time to enable better design, manufacturers to verify component quality by measuring prescribed parameters and ensuring they are within acceptable bounds, and operators to provide diagnosis of loads to identify conditions that may lead to premature failure. Furthermore, the output of the unknown parameter estimator may be an input into a controller for actuation or other active rotorcraft control.

While the inventions have been particularly shown and described with reference to preferred embodiments thereof, it will be understood to those skilled in the art that various changes in form and details may be made therein without departing from the spirit and scope of the invention as defined by the appended claims.

What is claimed is:

1. A method for assessing a rotating component comprising:
    mounting a plurality of sensors at multiple locations around a rotating component, the rotating component including a plurality of discrete features, a sensor location being stationary as the component rotates;
    measuring a response with each sensor as the component rotates; and with the sensor response providing a material property of the rotating component material for multiple rotational positions;
    calculating a parameterized function for load variations of the rotating component, the parameterized function including a plurality of parameters for each discrete feature of the rotating component; and assessing the stress on each discrete feature as a function of the material property and parameterized function.

2. The method as claimed in claim 1 wherein the rotating component is a planetary gear carrier plate.

3. The method as claimed in claim 2 wherein the sensors are mounted on an outer surface of a ring gear.

4. The method as claimed in claim 2 wherein a discrete feature of the plurality of discrete features is a carrier plate post on the planetary gear carrier plate.

5. The method as claimed in claim 1 wherein the number of sensors is equal to the number of discrete features.

6. The method as claimed in claim 1 wherein the parameters reflect mean load and peak load.

7. The method as claimed in claim 1 wherein the sensors are mounted in at least four locations.

8. The method as claimed in claim 1 wherein the sampling rate is asynchronous with a rotation rate for the rotating component.

9. The method as claimed in claim 1 wherein the sensors are mounted onto an annular material that encircles the rotating component.

10. The method as claimed in claim 9 wherein a coating is present between the sensors and the annular material.

11. The method as claimed in claim 10 wherein a conversion to the material property corrects for a coating thickness.

12. The method as claimed in claim 1 wherein a sampling rate for measuring sensor responses is greater than a rotation rate for the component multiplied by a number of discrete features, the sampling rate being sufficient to detect stress variations with rotational position.

13. The method as claimed in claim 1 further comprising: at least one additional sensor providing a condition related to strain.

14. The method as claimed in claim 1 wherein the sensor uses a magnetic field.

15. The method as claimed in claim 1 wherein the sensor uses an electric field.

16. The method as claimed in claim 1 wherein the material property is magnetic permeability.

17. The method as claimed in claim 1 wherein the material property is electrical conductivity.

18. A method for monitoring material condition in a vehicle comprising:
- mounting a sensor on a component of a vehicle, the component including a rotating component and a plurality of discrete features, the sensor being a magnetic stress gage and a sensor response varying with a condition of interest for the vehicle;
- placing instrumentation onto the vehicle;
- measuring a sensor response with the instrumentation while operating the vehicle to assess the stress on each discrete feature;
- calculating a parameterized function for load variations of the rotating component, the parameterized function including a plurality of parameters for each discrete feature of the rotating component;
- using the sensor response and parameterized function to identify a condition of interest in the rotating component; and
- removing the sensor and instrumentation from the vehicle.

19. The method as claimed in claim 18 wherein the condition is geometric misalignment of a component.

20. The method as claimed in claim 18 wherein both the sensor and instrumentation are reusable.

* * * * *